United States Patent
Isogawa et al.

(10) Patent No.: US 6,766,739 B2
(45) Date of Patent: Jul. 27, 2004

(54) GOLF BALL PRINTING METHOD

(75) Inventors: Kazuhiko Isogawa, Kobe (JP); Seiichiro Endo, Kobe (JP)

(73) Assignee: Sumitomo Rubber Industries Limited, Kobe (JP)

(*) Notice: Subject to any disclaimer, the term of this patent is extended or adjusted under 35 U.S.C. 154(b) by 122 days.

(21) Appl. No.: 10/024,204

(22) Filed: Dec. 21, 2001

(65) Prior Publication Data

US 2002/0137817 A1 Sep. 26, 2002

(30) Foreign Application Priority Data

Jan. 12, 2001 (JP) ........................................ 2001-005685

(51) Int. Cl.$^7$ ........................... B41K 1/42; C09D 11/10; C08K 5/07; C08K 5/29; C08K 5/3467
(52) U.S. Cl. ........................ 101/333; 523/160; 524/88; 524/196; 524/357; 524/558
(58) Field of Search ................................ 523/160, 161; 524/88, 196, 398, 439, 558, 357; 106/31.27, 31.6; 101/333, DIG. 40

(56) References Cited

U.S. PATENT DOCUMENTS

| 5,929,140 A | * | 7/1999 | Fujii et al. .................. 523/440 |
| 5,972,087 A | * | 10/1999 | Uraki et al. .............. 106/31.65 |
| 6,180,714 B1 | * | 1/2001 | Ohira et al. ................. 524/590 |
| 6,383,648 B1 | * | 5/2002 | Tamai et al. ................. 428/447 |
| 6,551,395 B2 | * | 4/2003 | Isogawa .................. 106/31.75 |
| 2003/0027663 A1 | * | 2/2003 | Okido et al. ................. 473/351 |
| 2003/0119943 A1 | * | 6/2003 | Tucker et al. ............... 523/160 |

FOREIGN PATENT DOCUMENTS

| JP | B2-2684951 | 12/1997 |
| JP | A11-114093 | 4/1999 |

* cited by examiner

*Primary Examiner*—Callie Shosho
(74) *Attorney, Agent, or Firm*—Birch, Stewart, Kolasch & Birch, LLP

(57) ABSTRACT

The invention provides an improved golf ball printing method which is capable of efficient printing control in the production of golf balls and provides a colorful or lustrous mark on the ball surface. The printing method uses a two-component reacting ink comprising a resin having a hydroxyl group, an isocyanate, a coloring agent containing a metal, and a β-diketone. The ink ensures pot life more than eight hours and does not need to replace with newly prepared ink all day long.

6 Claims, No Drawings

GOLF BALL PRINTING METHOD

BACKGROUND OF THE INVENTION

1. Field of the Invention

The present invention relates to a method of printing marks on golf balls with color inks. More particularly, it relates to a golf ball printing method using pad printing process capable of efficient production control as well as to a golf ball having a colorful mark printed by the printing method.

2. Description of the Related Art

In general, a golf ball bears a printed mark of a brand name, logo, symbol, play number or the like on a surface thereof. Typical methods of printing a mark on a golf ball surface are classified into two groups, a pad printing process and a transfer printing process. The pad printing process comprises the steps of: transferring an image formed of an ink contained in an ink fountain to a pad, and pressing the pad against the ball surface to transfer the ink image on the pad to the ball surface. The transfer printing process comprises the step of pressing a transfer foil having an ink layer forming an image against the ball surface to transfer the ink image to the ball surface. Since the pad printing process is capable of accommodating to a small lot production, it is employed more widely than the transfer printing process.

Printing inks for use in golf ball printing are classified by the curing mechanism: one-component ink which is cured through evaporation of solvent therein, and two-component ink which is cured by the reaction between the two components. The two-component ink generally comprises a base resin and a curing agent.

One problem associated with one-component ink is that marks printed with such an ink generally have an insufficient strength, which leads not only to easy peeling or chipping of a printed portion upon iron shot or the like but also to staining of a club face with ink thus peeled off.

On the other hand, a two-component reacting ink is advantageous in that: a printed mark formed from cured ink has good durability due to three-dimensional structure of the cured ink; and the ink component such as base resin or curing agent has an affinity to the ball surface to provide a printed mark having high adhesion to the ball surface. However, two-component reacting inks call for control of the rate of curing reaction, because mixing the base resin with curing agent in the ink fountain causes the curing reaction therein to increase viscosity of the ink therein.

If the curing reaction proceeds so fast that the ink viscosity becomes too high, a transferring an image formed of ink from an ink fountain to a ball surface through a pad becomes difficult. Particularly, the transferability of the ink to dimpled portions of the ball surface lowers and, hence, a resulting printed mark is likely to suffer from blurring and chipping. For this reason, it is a common practice to control the ink viscosity by appropriately adding a solvent to the ink in accordance as the curing reaction of the ink proceeds in the ink fountain. In the event the ink viscosity control relied only upon the dilution of the ink with a solvent becomes impossible, the ink in the ink fountain is replaced with newly prepared ink.

If a sufficient pot life is ensured by the control of the curing reaction of the ink, it is possible to prolong the time interval for ink replacement as well as to decrease variations in the density of the printed mark which may occur depending on the curing reaction.

In these years it is a trend that fashionable golf balls are preferred. Printing colorful marks instead of black marks provides such golf balls. Such colorful marks include chromatically colored marks using pigments, and lustrous metallic marks. Recently, golfers tend to prefer marks having metallic luster. To meet such a demand, the art of forming a mark having metallic luster with an ink containing metal powder has been proposed (refer to Japanese Patent Laid-Open Gazette No. HEI 11-114093 for example).

In the case of an ink blended with a coloring agent containing a metal powder such as copper powder or brass powder, or a metal-containing pigment, however, such a metal component acts as a catalyst in the curing reaction between the base resin and the curing agent thereby facilitating the curing reaction. Accordingly, two-component inks containing metal powder or metal-containing pigments involve a faster increase in viscosity than two-component inks free of metal powder or metal-containing pigment and hence suffer from a difficulty in viscosity control, which raises the problem of a further shortened pot life. The pad printing using ink having a short pot life requires frequent ink replacements, makes the printing process control cumbersome and raises the cost of producing golf balls.

SUMMARY OF THE INVENTION

An object of the present invention is to provide a golf ball printing method capable of efficient control of printing process using two-component reacting ink while ensuring a sufficient pot life.

According to the present invention, a method of printing a mark on a surface of a golf ball comprises a printing process using an ink comprising a resin having a hydroxyl group, an isocyanate, a coloring agent containing a metal, and a β-diketone.

It is to be noted that the term "mark", as used herein, is meant to include symbols, letters representing a brand name, an owner's name, or the like, figures, numerals representing a player number or the like, and other indicia.

These and other objects, features and attendant advantages of the present invention will be more fully appreciated from the reading of the following detailed description.

DETAILED DESCRIPTION OF THE PREFERRED EMBODIMENTS

The golf ball printing method of the present invention is characterized by using ink comprising a resin having a hydroxyl group, an isocyanate, a coloring agent containing a metal, and a β-diketone.

The ink used in the printing method of the present invention is first described.

The resin having a hydroxyl group reacts with the isocyanate to form a film in a printed mark. The resin having a hydroxyl group, hereinafter referred to as "OH-functional resin", may have at least one hydroxyl group in its polymer chain or at the terminal of its polymer chain. The hydroxyl group may be derived from alcohol, carboxylic acid or epoxy which constitutes the resin. Specific examples of such OH-functional resins include epoxy resin, polyester resin, polyacrylic acid, polyvinyl alcohol, and polyamide resin. Among them, epoxy resin is preferably used because it is excellent in adhesion to a ball surface.

The isocyanate serves as a curing agent for the resin having a hydroxyl group. Specific examples of such an isocyanate include hexamethylene diisocyanate, xylylene diisocyanante, tetramethylxylylene diisocyanante, tolylene diisocyanante, and hydrogenated diphenyl diisocyanante.

The content ratio of the curing agent (i.e. isocyanate) to OH-functional resin is preferably not less than 0.05, more preferably not less than 0.07, much more preferably not less than 0.1. The upper limit of the content ratio (i.e. curing agent/OH-functional resin) is preferably 1.0. If the content ratio is less than 0.05, a resulting mark has lowered durability due to the insufficient three-dimensional structure of the cured resin. If it is more than 1.0, curing proceeds so fast that a sufficient pot life cannot be ensured, resulting in lowered workability.

The β-diketone forms a chelate with the coloring agent containing a metal or surrounds the coloring agent containing a metal, thereby reducing the frequency of contact between the film-forming components (i.e. the combination of the OH-functional resin and the isocyanate) and the metal-containing coloring agent. Thus, the β-diketone serves to restrain the curing reaction between the OH-functional resin and the isocyanate from being facilitated by the metal-containing coloring agent.

The β-diketone preferably has such a low boiling point as to allow easy volatilization thereof. More preferably, the boiling point of the β-diketone ranges between 130° C. and 160° C. This is because the β-diketone is contained in order to inhibit an accelerated curing reaction by the metal-containing coloring agent in the ink fountain. After printing a mark on a ball surface, the β-diketone in the ink forming the printed mark should evaporate rapidly because the β-diketone has finished its role at this stage.

Examples of such β-diketones include acetylacetone, 3-methyl-2,4-pentadione, 3-ethyl-2,4-pentadione, 3-chloro-acetylacetone, trifluoroacetylacetone, hexafluoroacetylacetone, and 2,6-dimethyl-3,5-heptadione. Among them, acetylacetone is preferably used.

The amount of the β-diketone based on 100 parts by mass of the ink composition is preferably not less than 0.1 parts by mass, more preferably not less than 0.5 parts by mass, much more preferably not less than 1.0 part by mass. The ratio between the coloring agent and the β-diketone in content by mass (coloring agent: β-diketone) is preferably in the range of from 10:0.1 to 10:20, more preferably from 10:1 to 10:10. If the amount of the β-diketone is less than 0.1 parts by mass or the content ratio of the β-diketone to the coloring agent (β-diketone/coloring agent) is less than 0.1/10, it is insufficient to block the metal contained in the coloring agent. The upper limit of the amount of the β-diketone is preferably 25 parts by mass. In view of the relation between the amount of the β-diketone and the amount of the coloring agent used in the ink, the amount of the β-diketone as large as 25 parts by mass or the content ratio of the β-diketone to the coloring agent (β-diketone/coloring agent) as high as 20/10 is sufficient to block the coloring agent and, hence, excess β-diketone contributes only to an increase in the cost of the ink.

The coloring agent used in the present invention contains a metal. Examples of usable coloring agents include metal such as metal powder, metal salts such as red iron oxide, and metal complexes.

Metal complex such as copper phthalocyanine or zinc complex is capable of forming a chelate with the β-diketone and hence assumes a state where the metal thereof is blocked. Blocked metal does not accelerate the curing reaction. Among metal complex type coloring agents, copper phthalocyanine showing a brilliant blue color is preferably used.

Examples of usable metal powders include copper powder, brass powder, gold powder, silver powder, aluminum powder, and a metal powder having a copper-zinc alloy portion (i.e. brass portion) on the surface of each copper particle. Such a metal powder can impart a mark with a metallic tone. These metal powders as well as the metal complex accelerate the curing reaction as a catalyst. However, in the ink of the present invention, the metal powders are surrounded by the β-diketone and prevented from contacting the film-forming components, i.e., the combination of OH-functional resin and the curing agent, thereby inhibiting the catalytic action of the metal powder in the curing reaction.

In the case where the ink needs to transfer from an ink fountain to a pad and from the pad to a ball surface in the pad printing process, the viscosity of the ink is critical in terms of the printability and the appearance and the like of a printed mark. With a view to adjusting the ink viscosity a solvent is preferably contained in the ink. Even if the ink as prepared does not contain any solvent, it is preferred that a solvent be added to dilute the ink having an increased viscosity due to progress of the curing reaction.

Any organic solvent that is capable of homogeneously dispersing and dissolving the OH-functional resin may be used in the ink of the present invention. Specific examples of the organic solvents include aromatic hydrocarbons such as toluene; ester solvents such as methoxybutyl acetate; ether solvents such as methyl ethyl ether; and ketone solvents such as methyl ethyl ketone and cyclohexanone.

The viscosity of the ink used in the present invention is preferably within the range of from 3500 to 5300 cps, more preferably from 3500 to 5000 cps, much more preferably from 4000 to 5000 cps. If the ink viscosity is less than 3500 cps, which means that the proportion of the resin relative to the total amount of the ink is insufficient while the proportion of the solvent is excessive, a resulting printed mark is likely to blur. On the other hand, if the ink viscosity is more than 5300 cps, the transferability of the ink to and from a pad becomes lowered due to such a high viscosity, as a result, an incomplete printed mark is likely to be obtained.

Preferably, the ink viscosity falls within the foregoing range not only when the ink has just been prepared (when the OH-functional resin and the curing agent have just been mixed together) but also after lapse of eight hours from the mixing. In the continuous producing golf balls at a manufacturing factory, replacing an ink with another ink newly prepared in the middle of the production of the same day is cumbersome and brings about disadvantages in terms of productivity and material cost. It is therefore desirable that the ink viscosity be held within the foregoing range even if the viscosity rises while the ink is continued to use for eight hours without replaced with a newly prepared ink. It is possible to continue to use the inventive ink for eight hours because the β-diketone contained in the ink inhibits a steep rise in viscosity according as progress of the curing reaction.

If necessary, the ink used in the present invention may contain additives such as a matting agent, plasticizer, and filler in addition to the OH-functional resin, curing agent, coloring agent and β-diketone.

The printing method of the present invention is a method of printing a mark on a ball surface with use of the two-component reacting ink described above.

Though any one of known printing processes such as a process using a transfer foil and a process using a pad may be employed in the present invention, the pad printing process is preferably employed. This is because the pad printing process has a general merit that it is suited for printing onto a curved surface formed with dimples and for a small lot production. Further, in the case of preparing ink in the morning of one day, the ink in the ink fountain does not need to replace at least eight hours with a newly prepared ink during the printing process of the day because an increase in the viscosity of the ink can be suppressed to such an extent as not to impede the printing operation and not to affect the appearance of a resulting printed mark by the action of the β-diketone.

Specifically, the pad printing process employed in the present invention is a process including the steps of: applying the ink contained in an ink fountain to a pad so that the pattern of a mark is formed on the pad with the ink; and pressing the pad against the surface of a golf ball to transfer the ink forming the pattern from the pad to the surface of the golf ball.

Though the curing reaction of the ink in the ink fountain starts from mixing the base resin with the curing agent, the β-diketone can inhibit a rapid increase in viscosity due to the curing reaction. Accordingly, it is possible to prevent occurrence of cobwebbing between the pad and the ink fountain and between the pad and the ball surface in the process of transferring the ink from the ink fountain to the ball through the pad. Hence, it is possible to avoid chipping of a resulting printed mark caused by such cobwebbing and formation of an ink mass due to transfer of a stringing portion to the ball surface, whereby a clear and sharp mark can be obtained.

A silicone rubber pad is prferably used in pad printing.

As the need arises, drying is performed after printing step, i.e., after an intended mark has been transferred from the pad to the ball. The drying is achieved at room temperature or by means blowing of hot air at 40° C. to 80° C. In the drying step the curing reaction of the ink proceeds as the solvent contained therein volatilizes. If the boiling point of the β-diketone contained in the ink is low, the β-diketone volatilizes to release its blockage against the metal contained in the coloring agent, thereby facilitating the completion of the curing reaction of the ink.

The printing method of the present invention is applicable to golf balls of all types without any particular limitation. Examples of such golf balls include: a one-piece golf ball which is a sphere of vulcanized rubber such as a butadiene rubber, isoprene rubber or a like rubber; a multi-piece golf ball comprising a core of a vulcanized rubber sphere and a cover made from an elastomer, a resin or the like; and a wound-core golf ball comprising a wound core formed by winding rubber thread around a liquid center or a solid center and a cover made from an elastomer, a resin or the like.

A golf ball according to the present invention bears a colorful mark printed by the printing method of the present invention. The mark comprises a coloring agent and a urethane resin obtained by the curing reaction between OH-functional resin and isocyanate.

Preferably, a clear paint is applied onto the golf ball so as to coat the entire ball surface including the mark printed thereon, thereby protecting the mark and enhancing the gloss of the entire ball surface. A urethane paint is preferably used as the clear paint.

EXAMPLES

The present invention will be specifically described by way of examples, which are, in no way, construed limitative of the present invention.

Measurement and Evaluation Methods

1. Viscosity

The viscosity of each ink was measured using a viscometer (VISCOTESTER VT-04 manufactured by RION Co., Ltd.).

2. Pot Life

Each ink just prepared was measured for its viscosity (initial viscosity), thereafter left in a constant temperature chamber set at 40° C. for eight hours, and then measured again for its viscosity (viscosity after leaving). The viscosity after leaving was reduced to an index number on the basis of the initial viscosity assumed 1.0, and the pot life of each ink was evaluated based on the index of the viscosity after leaving of the ink according to the following rating criteria:

Category "○": $1.0 \leq$ viscosity after leaving $< 1.2$;
Category "Δ": $1.2 \leq$ viscosity after leaving $< 1.4$; and
Category "×": $1.4 \leq$ viscosity after leaving 3. Printability A mark was printed on a ball surface by pad printing process using each ink having been left for eight hours after the preparation thereof. The mark thus printed was evaluated according to the following rating criteria:

Category "○": a mark with no chipping, blurring or ink mass;
Category "Δ": a mark with a chipping, blurring or ink mass having a length of less than 1 mm; and
Category "×": a mark with a chipping, blurring or ink mass having a length of not less than 1 mm.

4. Durability of Printed Mark

The durability of each printed mark was evaluated from two viewpoints, i.e., impact resistance and scuff resistance.

a) Impact Resistance

Using a swing robot (manufactured by True Temper Co.) attached with a Wood driver #1, each ball was hit 200 times repeatedly at a head speed of 45 m/sec. The mark of each ball thus subjected to shots was evaluated as to the degree of peeling according to the following rating criteria:

Category "○": a mark not peeled;
Category "Δ": a mark with a peeled portion having a length of less than 2 mm; and
Category "×": a mark with a peeled portion having a length of more than 2 mm.

b) Scuff Resistance

Using the above robot attached with a sand wedge, a bunker shot was performed 50 times. Each mark thus subjected to bunker shots was evaluated as to the degree of peeling according to the following rating criteria:

Category "○": a mark with no chipping or scuffing;
Category "Δ": a mark with a chipping or scuffing having a length of less than 2 mm; and
Category "×": a mark with a chipping or scuffing having a length of more than 2 mm.

Manufacture of Golf Ball

1. Preparation of Ink

Inks Nos. 1 to 9 having respective compositions shown in Table 1 were prepared. Copper phthalocyanine blue or brass powder was used as a coloring agent. Acetylacetone produced by Daicel Chemical Ind. was used as β-diketone, while an aromatic hydrocarbon used as a solvent.

Inks Nos. 1 to 5 each containing acetylacetone were examples of the present invention, while other inks were comparative examples out of the scope of the present invention.

2. Printing of Mark

The surface of a two-piece golf ball comprising a rubber core and an ionomer cover covering the core was subjected to a sandblasting treatment, and then printed with a mark by pad printing (using a silicone rubber pad) with use of each of inks Nos. 1 to 9 thus prepared. After the printing, a clear paint was applied onto each golf ball so as to cover the entire golf ball surface including the mark thus printed thereon. In this case, a urethane paint was used as the clear paint.

The golf ball according to the present invention bears a mark printed with the ink of the present invention exhibiting the foregoing effects as well as good printability. In the manufacture of this golf ball it is possible to use the ink prepared without replaced with newly prepared ink in the beginning of a production run in the morning until the end of the production run in the evening of the same date. This is convenient in production control.

TABLE 1

|  | 1 | 2 | 3 | 4 | 5 | 6 | 7 | 8 | 9 |
|---|---|---|---|---|---|---|---|---|---|
| Ink composition | | | | | | | | | |
| Epoxy resin | 24 | 24 | 24 | 24 | 24 | 24 | 24 | 24 | 25 |
| Isocyanate | 2 | 2 | 2 | 2 | 2 | 2 | 5 | 2 | — |
| Phthalocyanine blue | 10 | 10 | 10 | 10 | — | 10 | 10 | — | 10 |
| Brass powder | — | — | — | — | 10 | — | — | 10 | — |
| Matting agent | 14 | 14 | 14 | 14 | 14 | 14 | 13 | 14 | 14 |
| Acetylaceton | 5 | 0.05 | 0.1 | 10 | 5 | — | — | — | — |
| Aromatic hydrocarbon | 45 | 49.95 | 49.9 | 40 | 45 | 50 | 48 | 50 | 51 |
| Evaluation | | | | | | | | | |
| Initial viscosity | 4000 | 4000 | 4000 | 4000 | 4300 | 4000 | 4200 | 4300 | 4100 |
| Viscosity after leaving | 4500 | 4800 | 4600 | 4400 | 5000 | 5500 | 7500 | 8000 | 4500 |
| Pot life | ○ | Δ | ○ | ○ | ○ | Δ | X | X | ○ |
| Printability | ○ | ○ | ○ | ○ | ○ | Δ | X | X | ○ |
| Impact resistance | ○ | ○ | ○ | ○ | ○ | ○ | ○ | ○ | X |
| Scuff resistance | ○ | ○ | ○ | ○ | ○ | ○ | ○ | ○ | X |

Inks Nos. 7 and 8 each exhibited a large increase in viscosity due to accelerated curing reaction by phthalocyanine blue or brass powder. They were judged to have a difficulty in ensuring pot life of eight hours because the viscosity of the ink largely increased and caused their inferior printability.

Ink No. 6 had a lowered initial viscosity as compared with inks Nos. 7 and 8 by adjustment of the amounts of the curing agent and solvent used. However, the viscosity of this ink after having been left for eight hours exceeded 5300 cps due to the absence of acetylacetone and, accordingly, the printability of ink No. 6 was inferior.

Ink No. 9 did not contain any curing agent. This ink did not exhibit a substantial increase in viscosity even in the absence of acetylacetone and hence exhibited satisfactory pot life and printability because curing reaction could not occur in the absence of a curing agent. However, ink No. 9 could not yield a mark having satisfactory durability. Though ink No. 9 does not contain any curing agent, the viscosity of the ink increased to such an extent as shown in Table 1 due to volatilization of the solvent therein.

Inks Nos. 1 to 5 each containing phthalocyanine blue or brass powder together with acetylacetone could suppress an increase in viscosity to a value less than 1.2 times as large as the initial viscosity and hence ensured a satisfactory pot life. Among them, ink No. 2 containing acetylacetone in an amount as small as 0.05 parts by mass exhibited somewhat inferior printability because the blocking effect of acetylacetone was insufficient.

The golf ball printing ink of the present invention is a two-component ink that is capable of yielding a mark having superior durability. Since an increase in the viscosity of the ink due to progress of the curing reaction of the ink is inhibited, the ink is capable of ensuring a sufficient pot life.

This application is based on Japanese Application Serial No. 2001-5685 filed in Japanese Patent Office on Jan. 12, 2001, the contents of which are hereby incorporated by reference.

While only certain preferred embodiments of the present invention have been described in detail, as will be apparent for those skilled in the art, certain changes and modifications may be made in embodiments without departing from the spirit and scope of the present invention as defined by the following claims.

What is claimed is:

1. A method of printing a mark on a surface of a golf ball, comprising a printing process using an ink comprising a resin having a hydroxyl group, an isocyanate, a coloring agent containing a metal, and a β-diketone;

wherein the printing process comprises the steps of:
applying the ink to a pad so that the pattern of the mark is formed on the pad with the ink; and pressing the pad against the surface of the golf ball to transfer the ink forming the pattern of the mark from the pad to the surface of the golf ball.

2. The method according to claim 1, wherein the β-diketone has a boiling point ranging between 130° C. and 160° C.

3. The method according to claim 1, wherein the β-diketone is acetylacetone.

4. The method according to claim 1, wherein the coloring agent is copper phthalocyanine.

5. The method according to claim 1, wherein the coloring agent is a metal powder.

6. The method according to claim 1, wherein the ink has a viscosity adjusted to fall within a range between 3500 cps and 5300 cps.

* * * * *